United States Patent [19]

Takeda et al.

[11] Patent Number: 4,958,335
[45] Date of Patent: Sep. 18, 1990

[54] OPTICAL HEAD ASSEMBLY WITH A MINIMUM OF INERTIA AND FEASIBLE FOR HIGH HIGH-SPEED ACCESS

[75] Inventors: Takayuki Takeda; Hiroshi Masaki; Isamu-Nose, all of Tokyo, Japan

[73] Assignee: Oki Electric Industry Co., Ltd., Japan

[21] Appl. No.: 286,723

[22] Filed: Dec. 19, 1988

[30] Foreign Application Priority Data

Dec. 23, 1987 [JP] Japan .................. 62-324138
Dec. 23, 1987 [JP] Japan .................. 62-324139

[51] Int. Cl.$^5$ .............................................. G11B 7/12
[52] U.S. Cl. ............................................. 369/44.14
[58] Field of Search .................. 358/342; 250/201; 369/44.11, 44.14

[56] References Cited

U.S. PATENT DOCUMENTS

| | | | |
|---|---|---|---|
| 4,321,701 | 3/1982 | Arquie et al. | 369/45 |
| 4,547,871 | 10/1985 | Sugiyama et al. | 369/44.14 X |
| 4,771,415 | 9/1988 | Taki | 369/44 X |

FOREIGN PATENT DOCUMENTS 59-11544 1/1984 Japan .

Primary Examiner—Robert L. Richardson
Attorney, Agent, or Firm—Edward D. Manzo

[57] ABSTRACT

An optical head assembly for use with an optical disk apparatus includes a magnetic circuit block having permanent magnets each being elongate in a track traversing direction and a yoke for forming a magnetic circuit which conducts a magnetic field generated by the permanent magnets. The yoke includes a first through hole extending in a focusing direction, magnetic gaps located at opposite sides of the first through hole in the track traversing direction and individually accommodating the permanent magnets, and a second through hole for admitting the light beam issuing in the track traversing direction to guide it to the first through hole. The first through hole and magnetic gaps each has a cross-section relatively long in the track traversing direction. A beam deflector is loosely fitted in the first through hole for deflecting in the focusing direction the light beam which is incident thereto from the second through hole. The beam deflector is supported by a carriage. An objective lens focuses the light beam deflected by the beam deflector in the focusing direction onto the recording medium surface. The objective lens is mounted on a lens holder which is in turn mounted on the carriage movably in the focusing direction. Guide members support the magnetic circuit block and carriage movably in the track traversing direction along the recording medium surface.

12 Claims, 7 Drawing Sheets

OPTICAL HEAD ASSEMBLY WITH A MINIMUM OF INERTIA AND FEASIBLE FOR HIGH HIGH-SPEED ACCESS

BACKGROUND OF THE INVENTION

1. Field of the Invention

The present invention relates to an optical head assembly suitable for use with an optical disk apparatus which records and reproduces data from an optical disk as desired.

2. Description of the Prior Art

An optical disk apparatus is available for recording or reproducing information out of an optical disk as desired in response to a command which is fed from a computer or similar processing system, as well known in the art. Generally, such an apparatus is comprised of a drive unit for driving an optical disk in a rotary motion, an optical head, and a control unit for controlling the drive unit and optical head. The operation of an optical disk apparatus is such that a radiation issuing from a semiconductor laser or similar light source in the form of a light beam is focused onto an optical disk to scan minute tracks provided on the disk at the intervals of 1.6 microns or so, whereby information is recorded in or reproduced from the tracks as needed. The optical head, therefore, has to fulfill three different kinds of functions: focus control adapted to regulate the light beam for adequate convergence such as to a spot diameter of 1 micron, track control for preventing the spot from moving out of a desired track, and access control for searching for a desired track.

Referring to FIG. 10 of the drawings, an example of prior art optical heads is schematically shown. As shown, the optical head includes optics which is made up of a semiconductor laser or similar light source 51, a beam splitter 52, and an objective lens 53. Also included in the optical head are a twin-element photodiode 54 and a magnetic circuit block 55 which is adapted to selectively shift the objective lens 53 in a focusing direction F and a track traversing direction T. The focusing direction F is perpendicular to a recording medium surface LDa of an optical disk LD while the track traversing direction T is parallel to the radial direction of the optical disk LD.

In operation, a light beam 56 issuing from the light source 51 is transmitted through the beam splitter 52 and then focused by the objective lens 53 onto a particular point $P_1$ on the disk LD. The resulting reflection 56a from the disk LD is transmitted through the objective lens 53 and thereby expanded in beam diameter. This expanded light beam is reflected and deflected perpendicularly by the beam splitter 52 to become incident to a photosensitive surface 57 of the twin-element photodiode 54. The photosensitive surface 57 of the twin-element photodiode 54 is divided into a pair of photosensitive areas 57a and 57b so that a tracking error may be detected in terms of a difference between the intensity of light incident to the photosensitive areas 57a and that of light incident to the photosensitive area 57b. A signal representative of such a tracking error is used to control the magnetic circuit block 55 and thereby to shift the objective lens 53 in the track traversing direction T. The parts and elements described so far implement the previously mentioned track control.

Focusing error detecting means produces a signal representative of a focusing error, although not shown in the figure. The magnetic circuit block 55 is controlled by the focusing error signal to move the objective lens 53 in the focusing direction F, whereby the focus control is accomplished.

A drawback with the tracking control system discussed above is that upon the shift of a track position being scanned from the point $P_1$ to a point $P_2$ a reflection 56b from the point $P_1$ to a point $P_2$ a reflection 56b from the point $P_2$ is brought out of the optical axis of the objective lens 53, as indicated by a dash-and-dot line in FIG. 10. In this condition, the beam incident to the photosensitive surface 57 of the twin-element photodiode 54 is shifted in proportion to the displacement of the objective lens 53, introducing an offset in the tracking error signal. It follows that the movable range of the objective lens 53 in the track traversing direction T cannot exceed 100 microns or so which accommodates the offset. Hence, the access control which is far broader than the track control as to the movable range of the lens 53 in the track traversing direction T has to be effected by driving the optical head assembly by a motor or similar transporting device. Then, the access speed would be critically effected by the mass or weight of the optical head assembly.

An approach heretofore proposed for providing faster access is to construct the object lens 53, magnetic circuit block 55 and beam splitter 52 to be movable while fixing the other optical elements in place. This kind of scheme may be successful in reducing the weight of the movable sections to a significant degree, compared to the case wherein the entire optical head is movable. However, since the magnetic circuit block 55 which is one of the movable sections includes a permanent magnets, yokes and other various members, an access time several times longer than with the head assembly for a magnetic disk is needed.

FIG. 11 shows another prior art optical head assembly which is also directed toward faster access and disclosed in Japanese patent laid-open publication No. 11544/1984. In the FIG. a magnetic circuit block 62 is fixed in place to extend in the track traversing direction T and provided with two magnetic gaps 61 which individually cover the entire track extension. The magnetic circuit block 62 includes permanent magnets 63 and yokes 64. A pair of flat support pieces 65 are positioned in such a manner as to sandwich the magnetic circuit block 62 from above and below. An objective lens 66 and a movable coil 67 are securely mounted on the support pieces 65.

The upper and lower support pieces 65 are mounted on two parallel frames 69 through rollers 68 which are located at four corners of each support piece 65, whereby the support pieces 65 are movable up and down, i.e., in the focusing direction F. The frames 69 in turn are mounted through rollers 71 on parallel guide rails 72 which are fixed to the magnetic circuit block 62 and, therefore, the frames 69 are movable in the lengthwise direction T of the block 62. That is, the optical head assembly of FIG. 11 is constructed and arranged such that the support plates 65 carrying the objective lens 66 therewith is selectively movable in the focusing direction F and the track traversing direction T while traversing all of the tracks of an optical disk in the traversing direction T, due to electromagnetic forces exerted by the focusing coil and tracking coil.

It will therefore be seen that the optical head assembly of FIG. 11 is effective to reduce the weight or mass of the movable section because the magnetic circuit block 62 having a substantial weight is not movable. Nevertheless, this kind of scheme has a shortcoming that the movable section for driving the objective lens 66 in the focusing direction F and the track traversing direction T has a complicated structure and therefore involves a great number of structural parts and elements. Another shortcoming is that the mechanical strength or rigidity of the movable section is not sufficient.

Generally, thrust developed by the electromagnetic force of a coil which is disposed in a magnetic gap is proportional to the flux density, and the acceleration of a movable section is produced by dividing the thrust by the weight of the movable section. The access time is proportional to the square root of the acceleration. With the optical head assembly of FIG. 11, it is impractical to increase the flux density in the magnetic gap 61 to a satisfactory degree because increasing it to such a degree would cause the magnetic flux to concentrate on end portions 64a of the yokes 64 to bring about magnetic saturation. For this reason, it is impossible to apply a sufficient thrust to the support pieces 65.

The yokes 64 may be provided with a thicker configuration to increase the flux density. This, however, requires the frames 69 and movable coil 67 to be increased in width also, resulting in an increase in the overall weight of the assembly. Moreover, broader dimensions of the support pieces 65 and frames 69 aggravate the mechanical strength or rigidity of the same and thereby lowers the structural resonance frequency of the movable section. Usually, a servo band of several kilohertz is needed for the focus control and track control of an optical head, as generally accepted. Hence, the structural resonance frequency of the movable section has to be selected to be at least five times higher than the servo band. Lower resonance frequencies of the movable band, therefore, would limit the servo band available and degrade the following characteristic. In addition, the mechanical strength of the support pieces 65 and frames 69 cannot be increased without increasing the weight of the movable section and therefore without limiting the access speed. Consequently, it is impossible to increase the access time to a sufficient degree.

SUMMARY OF THE INVENTION

It is therefore an object of the present invention to provide an optical head assembly for an optical disk apparatus which enhances fast access and therefore allows data to be written in and read out of an optical disk at a high speed.

In accordance with the present invention, an optical head assembly for use with an optical disk apparatus for focusing a light beam in a track traversing direction which is substantially parallel to a radial direction of an optical disk onto a recording medium surface of said optical disk from a focusing direction which is substantially perpendicular to the recording medium surface, and guiding a reflection from the recording medium surface along the same path as but in the opposite direction to the light beam to record and/or reproduce information out of the optical disk includes a magnetic circuit block. The magnetic circuit block comprises magnets each being elongate in the track traversing direction and a yoke for forming a magnetic circuit which conducts a magnetic field generated by the permanent magnets. The yoke is provided with a first through hole extending throughout the yoke in the focusing direction, magnetic gaps located at opposite sides of the first through hole in the track traversing direction and each accommodating respective one of the permanent magnets, and a second through hole for admitting the light beam issuing in the track traversing direction to guide the light beam to the first through hole. The first through hole and magnetic gaps each has a cross-section which is relatively long in the track traversing direction. A beam deflector is loosely fitted in the first through hole for deflecting in the focusing direction the light beam which is incident to the beam deflector via the second through hole. The beam deflector is mounted on a carriage. An objective lens focuses the light beam deflected by the beam deflector in the focusing direction onto the recording medium surface. The objective lens is held by a lens holder which is mounted on the carriage movably in the focusing direction. The magnetic circuit block and carriage are supported on guide members movably in the track traversing direction along the recording medium surface. A focusing coil is wound around the lens holder and partly contained in the magnetic gaps for, when a current is fed through the focusing coil, transporting the lens holder in the focusing direction in cooperation with the magnetic field which is developed by the permanent magnets. Tracking coils are wound around the lens holder and partly contained in the magnetic gaps for, when a current is fed through the tracking coils, transporting the lens holder in the track traversing direction in cooperation with the magnetic field which is developed by the permanent magnets. Drive means is connected to the magnetic circuit block for transporting the it in the track traversing direction along the recording medium surface with the block being guided by the guide members.

Further, in accordance with the present invention, an optical head assembly for use with an optical disk apparatus for focusing a light beam in a track traversing direction which is substantially parallel to a radial direction of an optical disk onto a recording medium surface of said optical disk from a focusing direction which is substantially perpendicular to the recording medium surface, and guiding a reflection from the recording medium surface along the same path as but in the opposite direction to the light beam to record and/or reproduce information out of the optical disk includes a stationary magnetic circuit block. The stationary magnetic circuit block extends over an effective recording range of the recording medium surface in the track traversing direction. The magnetic circuit block comprises permanent magnets each being elongate in the track traversing direction and a yoke for forming a magnetic circuit which conducts a magnetic field generated by the permanent magnets. The yoke is provided with a first through hole extending throughout the yoke in the focusing direction, magnetic gaps located at opposite sides of the first through hole in the track traversing direction and each accommodating a respective one of the permanent magnets, and a second through hole for admitting the light beam issuing in the track traversing direction to guide the light beam to the first through hole. The first through hole and magnetic gaps each has a cross-section which is relatively long in the track traversing direction. A beam deflector is loosely fitted in the first through hole for deflecting in the focusing direction the light beam which is incident to the beam deflector via the second through hole. The beam deflector is mounted on a carriage. An objective lens focuses the light beam deflected by the beam deflector in the focusing direction onto the recording medium surface. The objective lens is held by a lens holder which is mounted on the carriage movably in the focusing direction. The carriage is supported on guide members movably in the track traversing direction along the recording medium surface. A focusing coil is wound around the lens holder and partly contained in the magnetic gaps for, when a current is fed through the focusing coil, transporting the lens holder in the focusing direction in cooperation with the magnetic field which is developed by the permanent magnets. Tracking coils are wound around the lens holder and partly contained in the magnetic gaps for, when a current is fed through the tracking coils, transporting the lens holder in the track traversing direction in cooperation with the magnetic field which is developed by the permanent magnets.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
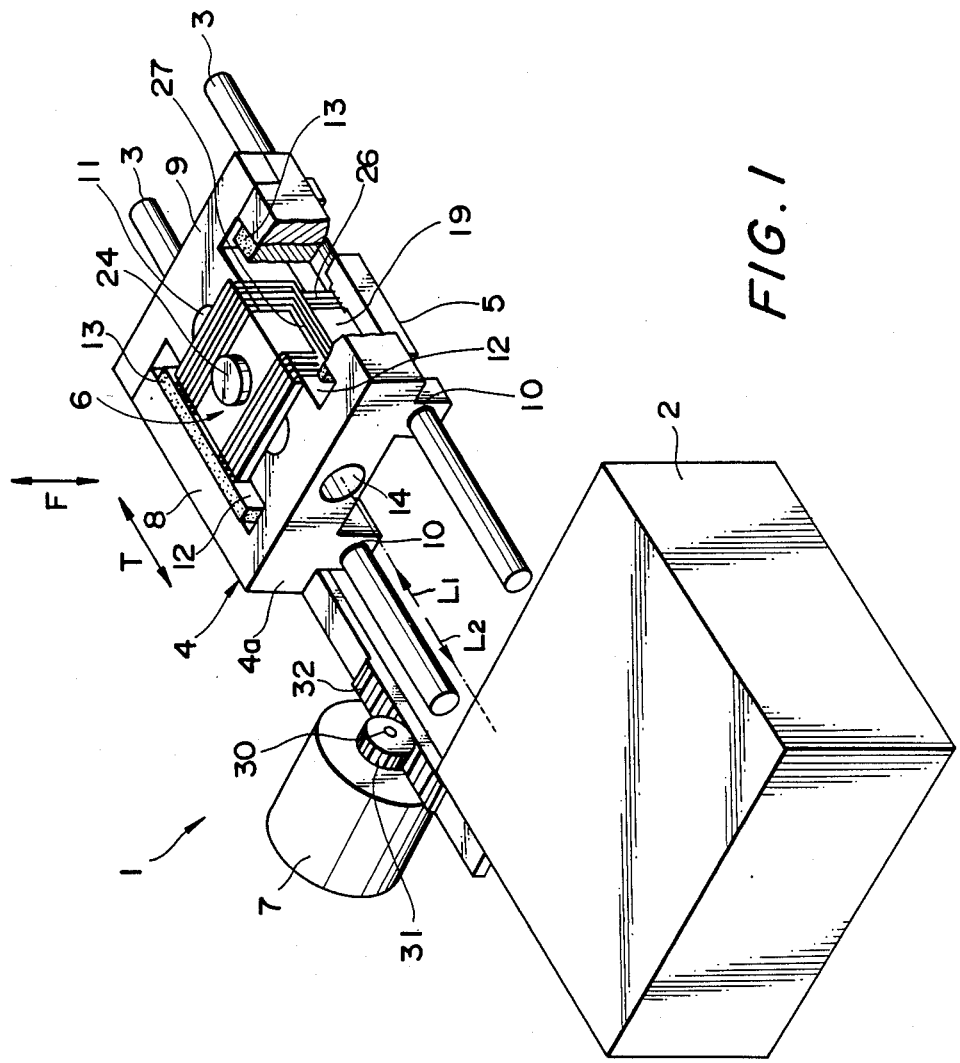
FIG. 1 is a partly broken perspective view of an optical head assembly embodying the present invention.
Figure 2:
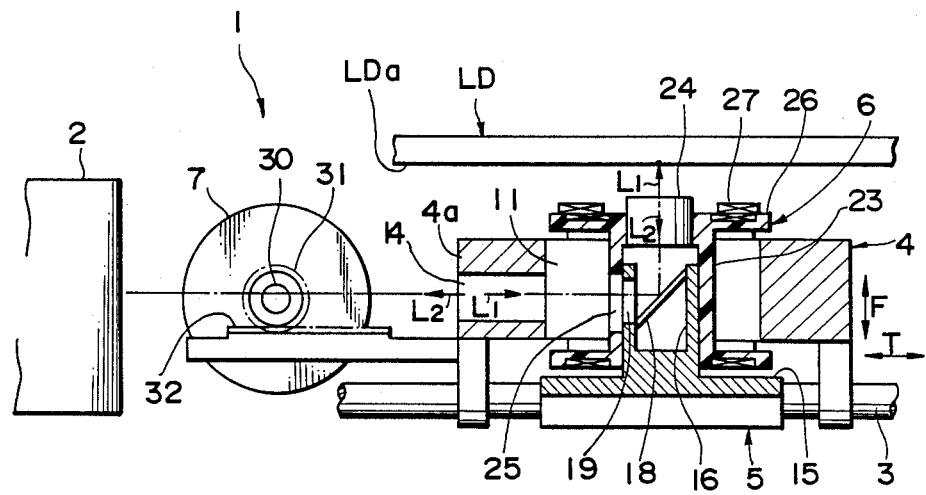
FIG. 2 is a sectional side elevation of the optical head assembly shown in FIG. 1.

Referring to FIGS. 1 and 2, an optical head assembly embodying the present invention is shown and generally designated by the reference numeral 1. As shown, the optical head assembly 1 is located to face a recording medium surface LDa of an optical disk LD and includes optics 2 which is fixed in place. A light beam $L_1$ issuing from the optics 2 is incident to the recording medium surface LDa in the focusing direction F which is perpendicular to the surface LDa and may be shifted in the track traversing direction T along the radius of the disk LD in parallel to the surface LDa. A magnetic circuit block 4 is slidably mounted on a pair of spaced guide members 3 each being implemented by a rod. A carriage 5 is also slidably mounted on the guide members 3 below the magnetic circuit block 4. A lens holder 6 is provided on the carriage 5 to be movable up and down as needed. A stepping motor 7 plays the role of means for shifting the magnetic circuit block 4.

The optics 2 includes various devices such as a semiconductor laser, a focus error sensor, a track error sensor and a signal sensor (none of them is shown in the figure). The optics 2 functions to emit the light beam $L_1$ in the track traversing direction T and to receive a reflection $L_2$ from the recording medium surface LDa. The guide members 3 are fixed in place in such an orientation that a guiding direction or lengthwise direction thereof is parallel to the track traversing direction T.

Figure 3:
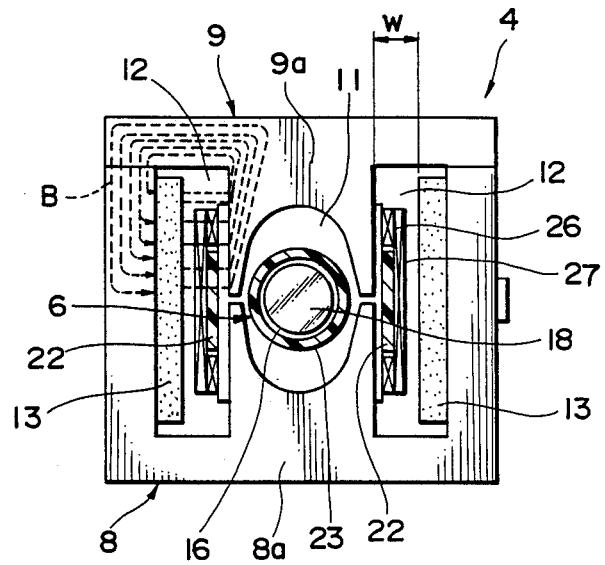
FIG. 3 is a sectional plan view of a magnetic circuit block included in the embodiment of FIG. 1.

As shown in FIGS. 1 and 3, the magnetic circuit block 4 includes a main yoke 8 and a subyoke 9 which are put together in a generally flat configuration. Slide bearings 10 individually extend downward from the underside of the main and subyokes 8 and 9, and the unit 4 is mounted on the guide members 3 through the slide bearings 10. A through hole 11 is formed in a central part of the magnetic circuit block 4 in the focusing direction F. Further, two parallel magnetic gaps 12 are defined in the magnetic circuit block 4 at opposite sides of the through hole 11. The through hole 11 and magnetic gaps 12 are each elongate in the track traversing direction T and, further, the hole or slot 11 is provided with a generally elliptical shape which is elongate in the track traversing direction T. Plate-like permanent magnets 13 are individually received in the magnetic gaps 12 and securely connected to the main yoke 8 which form the outer walls of the magnetic gaps 12. As shown in FIGS. 1 and 2, a through hole 14 is formed through that surface 4a of the magnetic circuit block 4 which faces the optics 2 for the purpose of guiding the light beam $L_1$ from the optics 2 to the shot 11.

In the above construction, the end portions 8a and 9a of those portions of the main and subyokes 8 and 9 which face the permanent magnets 13, i.e., which surround the slot 11 are each provided with substantial width. Hence, a magnetic flux B developed as represented by dashed lines in FIG. 3 and therefore the magnetic flux in each magnetic gap 12 achieves a high flux density without forcing the magnetic circuit block 4, i.e., the lens holder 6 which will be described to be increased in dimensions.

Figure 4:
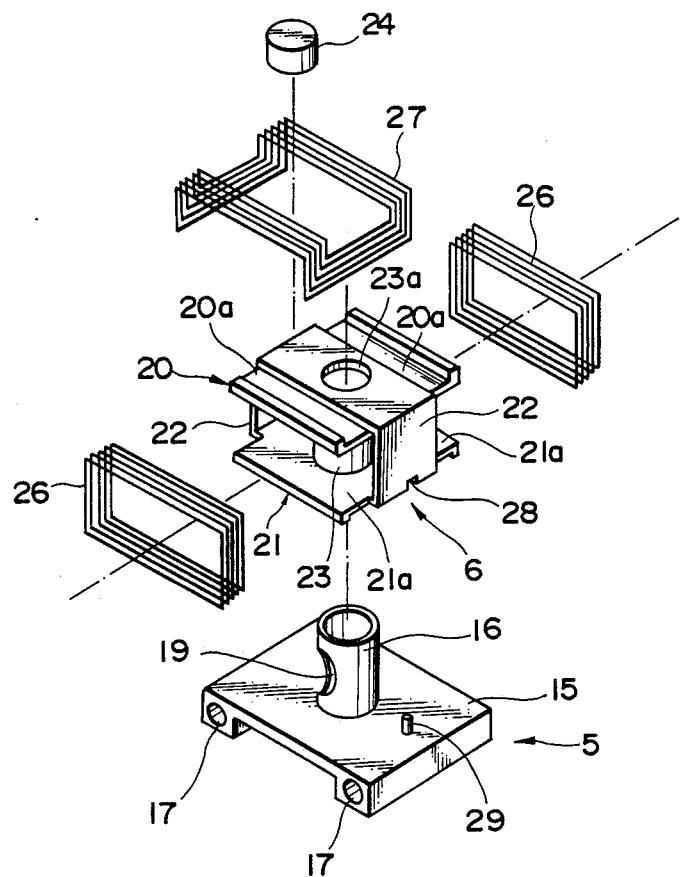
FIG. 4 is an exploded perspective view of a carriage and a lens holder also included in the embodiment of FIG. 1.

As shown in FIGS. 2, 3 and 4, the carriage 5 includes a base plate 15 from the upper surface of which as hollow cylindrical beam deflecting portion 16 extends upward. The carriage 5 is mounted on the guide members 3 with the beam deflecting portion 16 being received in the through hole or slot 11 of the magnetic circuit block 4 and through slide bearings 17 which are formed in the base plate 15. A beam deflector in the form of a flat mirror 18 is fixed in place within the beam deflecting portion 16 and at an inclination of 45 degrees relative to the focusing direction F. An opening 19 is formed through the wall of the beam deflecting portion 16 to admit the light beam $L_1$ therethrough. The carriage 5 having such a configuration can be fabricated with ease by, for example, preparing the base plate 15 by molding plastic or ceramic, machining a hollow cylinder made of aluminum alloy or similar metal to form the beam deflecting portion 16, and adhering this portion 16 to the molding 15.

As illustrated in FIGS. 2 and 4, the lens holder 6 includes an upper plate 20, a lower plate 21, a pair of side plates 22 tying the upper and lower plates 20 and 21, and a tubular portion 23 having a cylindrical configuration, for example, and open at the center of each of the plates 20 and 21. An objective lens 24 is received in an upper opening 23a of the tubular portion 23 with its optical axis extending in the focusing direction F. An opening 25 is formed through the wall of the tubular portion 23 to admit the light beam $L_1$ into the tubular portion 23. Further, the upper and lower plates 20 and 21 are respectively provided with projections 20a and 21 a at opposite ends thereof. Tracking coils 26 are individually wound around the associated projections 20a and 21a of the upper and lower plates 20 and 21. A focusing coil 27 is securely mounted on the lens holder 6 by adhesion in such a manner as to surround the objective lens 24. More specifically, the focusing coil 27 is partly laid on the tracking coils 26 which are located on the projections 20a of the upper plate 20, opposite ends of the coil 27 being bent to extend along the opposite side plates 22. In this configuration, when the lens holder 6 is mounted on the carriage 5, the magnetic flux of the magnetic circuit block 4 extends throughout the coils 26 and 27. As electric current is caused to flow through the coils 26 and 27 in such a condition, thrusts are developed in the focusing direction F and the track tracversing direction due to the resulting electromagnetic force.

As shown in FIGS. 1 and 3, the opposite side plates 22. tracking coils 26 individually extending along side plates 22, and the focusing coil 27 are loosely fitted in the spaced magnetic gaps 12 of the magnetic circuit block 4. The beam deflecting portion 16 of the carriage 5 is loosely fitted in the tubular portion 23 of the lens holder 6. In this condition, the lens holder 6 is mounted on the carriage 5 movably in the focusing direction F. More specifically, the tubular portion 23 of the lens holder 6 is movably received in the elliptical slot 11 of the magnetic circuit block 4, allowing the lens holder 6 to move in the track traversing direction T. Further, as shown in FIG. 4, the lens holder 6 is provided with a recess 28 at its underside while the base plate 15 of the carriage 5 is provided with a pin 29. The recess 28 and the pin 29 mating with each other serve to prevent the lens holder 6 from rotating. The lens holder 6 having the above configuration may advantageously be implemented by a single molding of plastic having a good sliding characteristic.

In the lens holder 6, the projections 20a and 21a of the upper and lower plates 20 and 21 around which the tracking coils 26 are wound are reduced in thickness to promote light weight configuration. The lens holder 6 having the above construction and carrying the coils 26 and 27 thereon achieves a high mechanical strength or rigidity and, yet, it is only the thickness of the coils 26 and 27 that should be accommodated by the magnetic gaps 12, as shown in FIG. 3. This allows the width w of each magnetic gap 12 to be reduced to about 1 to 2 millimeters, for example, and also allows the thickness of each permanent magnet 13 to be reduced, thereby reducing the overall dimensions and weight of the magnetic circuit block 4.

As shown in FIGS. 1 and 2, a pinion 31 is securely mounted on the output shaft 30 of the stepping motor 7 and constantly meshed with a rack 32 which is rigidly mounted on the magnetic circuit block 4 to extend in the track traversing direction T. When energized, the stepping motor 7 causes the magnetic circuit block 4 to move in the track traversing direction T.

The configuration of an optical disk applicable to the present invention will be described. Generally, a disk memory is made up of a directory storing section, a data storing section, and an alternative data storing section. The directly storing section stores information which is necessary for the search of stored data while the data storing section stores data. The alternative data storing section is available for storing data in place of the data storing section when the latter is partly disabled due to some fault.

Figure 5:
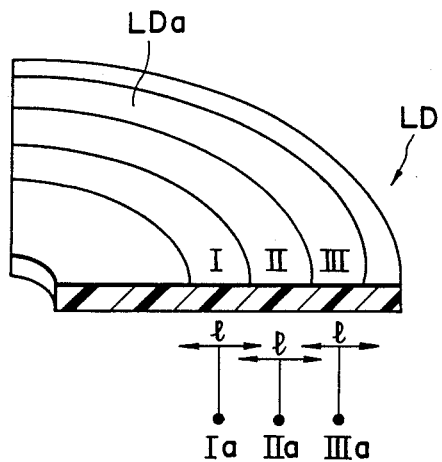
FIG. 5 is a schematic diagram showing divided regions of an optical disk applicable to the embodiment of FIG. 1.

In the illustrative embodiment, the recording medium surface LDa of the optical disk LD has three different regions I, II and III, each provided with the directly storing section, data storing section, and alternative data storing section. Assuming that the optical disk LD has a diameter of 130 millimeters by way of example, a recording area extends from a radius of 30 millimeters to a radius of 60 millimeters and has a storage capacity of about 300 megabytes. Hence, each of the regions I, II and III shown in FIG. 5 has a width of 10 millimeters as measured in the radial direction and a storage capacity of 100 megabytes.

When an optical disk LD having the above specifications is applied to this particular embodiment, the various portions of the lens holder 6 and magnetic circuit block 4 are so dimensioned as to allow the lens holder 6 to move in the magnetic circuit block 4 over a distance l which is slightly greater than the width of each of the regions, I, II and III, i.e. 10 millimeters. The magnetic circuit block 4 selects any of the center positions Ia, IIa and IIIa of the regions I, II and III under the control of a control circuit, not shown.

The optical head assembly 1 constructed and arranged as described above will be operated as follows.

As shown in FIG. 2, the light beam $L_1$ issuing from the optics 2 in the track traversing direction T is propagated through the opening 14 of the magnetic circuit block 4, the opening 25 of the lens holder 6, and the opening 19 of the beam deflecting portion 16 of the carriage 5 in sequence. Reflected by the mirror 18, the light beam $L_1$ is deflected 90 degrees in the focusing direction F to become incident to the objective lens 24 along the optical axis of the lens 24. The objective lens 24 focuses the beam $L_1$ onto the recording medium surface LDa of the optical disk LD. A reflection $L_2$ from the recording medium surface LDa is returned to the optics 2 along the same optical path as but in the opposite direction to the beam $L_1$. The focus and track error sensors and signal sensor built in the optics 2 as stated earlier are responsive to the reflection $L_2$.

As regards the focus control, a current derived from a signal representative of a focus error sensed as stated above is caused to flow through the focusing coil 27 to shift the lens holder 6 upward or downward, i.e., in the focusing direction F. Hence, the objective lens 24 accurately follows any vertical oscillation of the optical disk LD which is ascribable to the rotation of the disk LD.

On the other hand, the track control is effected by causing a current based on a track error signal to flow through the tracking coils 26. Such a current displaces the lens holder 6 sideways, i.e., in the track traversing direction T within the magnetic circuit block 4, whereby the objective lens 24 is allowed to follow any offset of the track on the recording medium surface LDa which may occur due to the offset of the center of the disk LD. At this instant, since the lens holder 6 moves together with the carriage 5, i.e., since the objective lens 24 and the mirror 18 move integrally with each other, the beam $L_1$ and its reflection $L_2$ are each prevented from being deviated from the optical axis.

The access control involves two different modes which are respectively assigned to the access within any of the regions, I, II and III of the optical disk LD and the access straddling the regions I, II and III, as described hereinafter.

First, when the access is to be made within any of the regions I, II and III of the optical disk LD, the access control is effected by causing a current to flow through the tracking coils 26 in association with a difference between a designated track and the current track and under the control of a controller, not shown, and thereby shifting the lens holder 6 within the magnetic circuit block 4 in the track traversing direction T as in the track control. In this case, therefore, only the lens holder 6 and the carriage 5 are moved. Since the weight of these movable members inclusive of the coils 26 and 27 is reduced to about 5 to 10 grams and since the flux density in the magnetic gaps 12 are sufficiently high as stated earlier, fast access comparable with the access particular to an ultrahigh-speed magnetic disk is accomplished.

On the other hand, when access is effected from one of the regions, I, II and III to another such as from a track in the region I to a track in the region II, a current is fed through the tracking coils 26 by the controller, not shown, to shift the lens holder 6 in the track traversing direction T. At the same time, the stepping motor 7 is driven to move the magnetic circuit block 4 from the center position Ia of the region I to the center position IIa of the region II. It is to be noted that the velocity of the lens holder 6 is selected to be lower than the velocity of the magnetic circuit block 4 to prevent the lens holder 6 from hitting against the block 4 within the slot 11. Again, all of the lens holder 6, carriage 5 and magnetic circuit block 4 are moved in the track traversing direction along the guide members 3, preventing the beam $L_1$ and its reflection $L_2$ from being brought out of the optical axis of the lens 24.

Figure 6A:
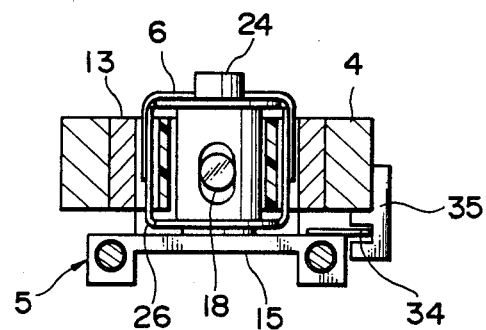
FIG. 6A is a partly sectional view showing a carriage and a lens holder included in an alternative embodiment of the present invention.
Figure 6B:
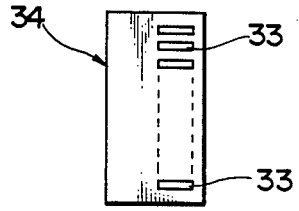
FIG. 6B is a plan view of a slit plate shown in FIG. 6A.

Referring to FIGS. 6A and 6B, an alternative embodiment of the present invention is shown. In the FIGS., the same or similar structural elements as those shown in FIGS. 1 to 4 are designated by like reference numerals. In this particular embodiment, a slit plate 34 formed with a great number of slits 33 as shown in FIG. 6B is mounted on the base plate 15 of the carriage 5. A photosensor 35 is mounted on the magnetic circuit block 4 to determine a position of the carriage 5 relative to the magnetic circuit block 4 by sensing the slits 33 of the slit plate 34. In such a construction, the second-mentioned or region-to-region access control includes a step of feeding a current through the tracking coils in response to an output of the photosensor 35 and thereby moving the lens holder 6 and carriage 5 to a predetermined position relative to the magnetic circuit block 4. As the magnetic circuit block 4 is fully shifted, the lens holder 6 is moved to a designated track. This eliminates the fear of the lens holder 6 and magnetic circuit block 4 colliding against each other within the slot 11. The rest of the construction, operation and effect of the embodiment shown in FIGS. 6A and 6B is the same as that of the previous embodiment.

While the embodiments of the present invention have been shown and described in relation to an optical disk whose diameter is 130 millimeters, the present invention is of course applicable to optical disks having other diameters. The number of regions defined in an optical disk is also open to choice. Further, the number of positions where the magnetic circuit unit 4 stops its movement may be smaller than the number of regions of an optical disk.

The magnetic circuit unit 4 may be driven by any suitable means other than the stepping motor 7 shown and described. For example, when the number of positions where the unit 4 may stop is two, a solenoid or similar drive means may be used to promote the ease of drive.

Furthermore, the carriage 5 and the magnetic circuit block 4 may each be movably supported by a different guide member or members.

In summary, any of the embodiments of the present invention described above realizes an ultrahigh-speed access comparable with the access particular to an ultrahigh-speed magnetic disk within a desired region of an optical disk. All the tracks provided on an optical disk can be accessed by moving a magnetic circuit block. In both of track control and access control a light beam and a reflection from the recording medium surface of an optical disk are surely held in the optical axis and, therefore, stable operations are insured over all of the tracks.

Figure 7:
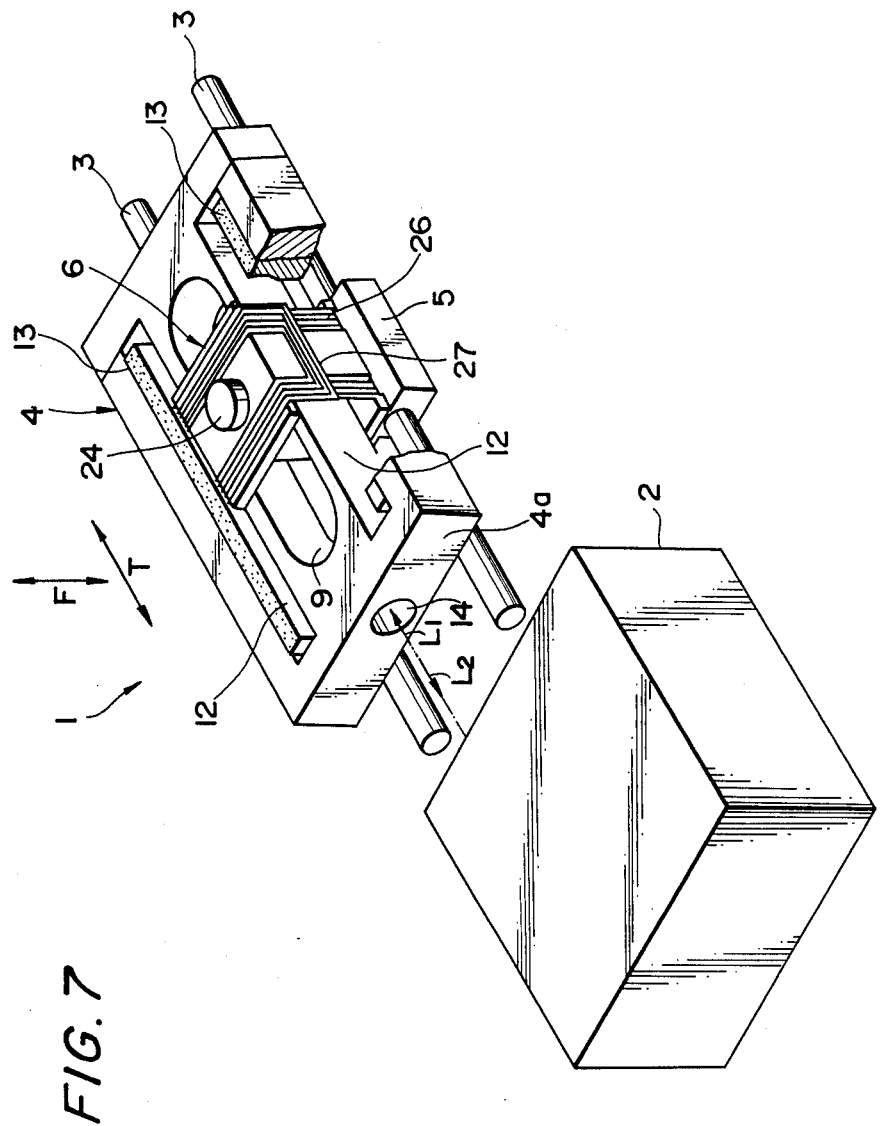
FIG. 7 is a partly broken perspective view of another alternative embodiment of the present invention.
Figure 8:
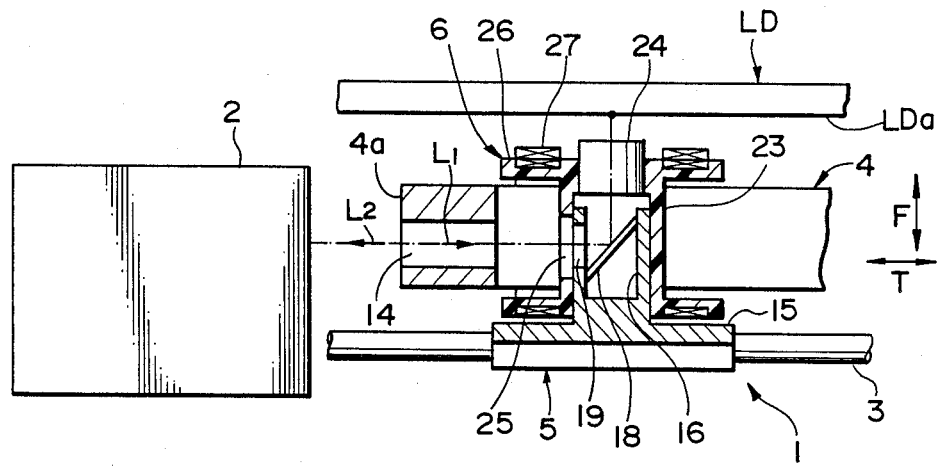
FIG. 8 is a partly omitted sectional side elevation of the embodiment shown in FIG. 7 and similar to FIG. 2.
Figure 9:
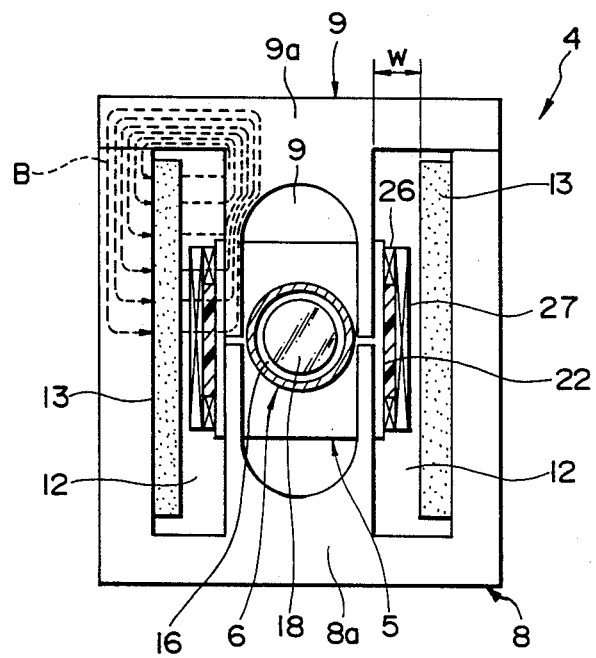
FIG. 9 is a sectional plan view showing a magnetic circuit block included in the embodiment of FIG. 7 and similar to FIG. 3.
Figure 10:
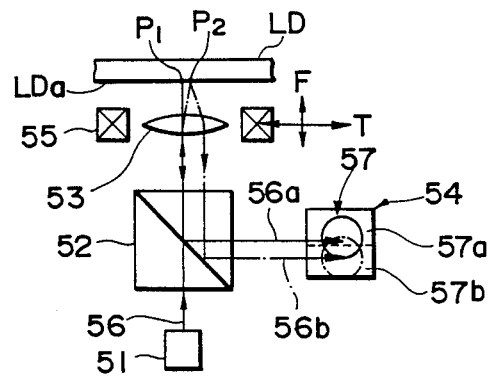
FIG. 10 schematically shows a prior art optical head assembly.
Figure 11:
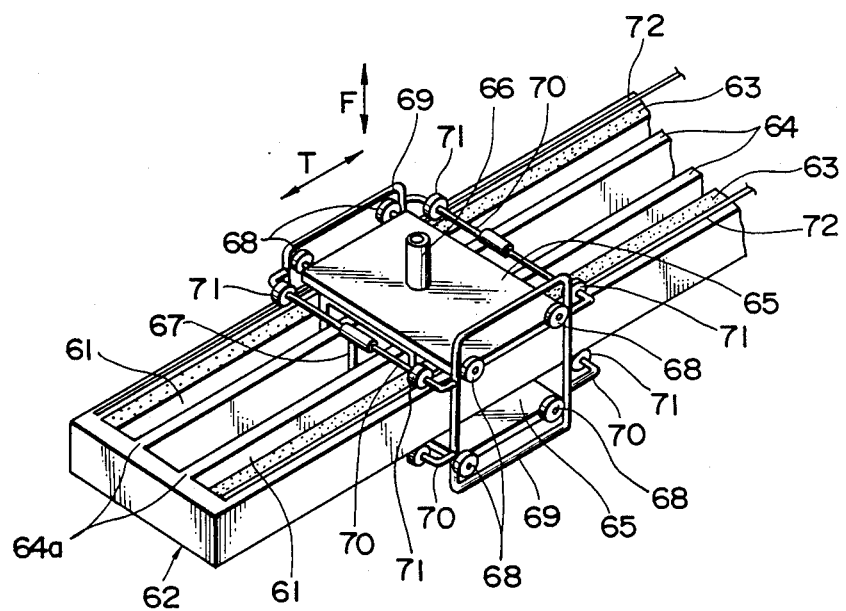
FIG. 11 is a perspective view showing another prior art optical head assembly.

FIGS. 7 and 8 illustrate another alternative embodiment of the present invention. In the figures, similar components or structural elements are designated by the same reference numerals, and redundant description will be avoided for simplicity. In this particular embodiment, the magnetic circuit block 4 is fixed in place. The optical head assembly 1 of this embodiment is made up of the unmovable magnetic circuit unit 4, unmovable guide members 3 implemented by two rods, carriage 5 located below the unit 4 and slidable on and along the guide members 3, and lens holder 6 mounted on the carriage 5 and movable up and down. The lengthwise or guiding direction of the guide member 3 is parallel to the track traversing direction T. The embodiment of FIGS. 7 and 8 differs from the embodiment described with reference to FIG. 1 in that the magnetic circuit block 4 is unmovable, and that the carriage 5 is movable in the track traversing direction T on and along the guide members 3 and, therefore, means for mechanically transporting the block 4 such as a stepping motor is absent.

The alternative embodiment of FIGS. 7 and 8 operate in the same manner as the embodiment of FIG. 1 as to both of the focus control and the track control. In the event of access control, a current associated with a difference between a designated track and the current track is fed through the tracking coils 26 by a controller, not shown. Consequently, the lens holder 6 is shifted in the track traversing direction T as in the track control. In this embodiment, the access control is effected by feeding a current through the tracking coils 26 as stated, the various portions of the magnetic circuit block 4 and lens holder 6 are so dimensioned as to allow all of the tracks on the recording medium surface of the optical disk LD to be accessed over the entire width in the traversing direction T. During the access control, the light beam $L_1$ and its reflection $L_2$ are preventing from being deviated from the optical axis as during the track control.

It is to be noted that while the focus control and the track control are performed in combination as needed, the track control alone is disenabled for a moment in the event of track control and enabled again after the objective lens 24 has been moved to a desired position.

It will be appreciated from the above that in the embodiment of FIGS. 7 and 8 the movable section has a simple structure which is light weight and highly rigid and, yet, the flux density in each magnetic gap is increased. Hence, the optical head assembly of this embodiment accurately follows any irregular movement or oscillation of an optical disk and achieves ultrahigh-speed access comparable with that of an ultrahigh-speed magnetic disk.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An optical head assembly for use with an optical disk apparatus for focusing a light beam issuing in a track traversing direction which is substantially parallel to a radial direction of an optical disk onto a recording medium surface of said optical disk from a focusing direction which is substantially perpendicular to said recording medium surface, and guiding a reflection from said recording medium surface along a same path as but in the opposite direction to the light beam to record and/or reproduce information out of said optical disk, said assembly comprising:

magnetic circuit means comprising permanent magnets each being elongate in the track traversing direction and a yoke for forming a magnetic circuit which conducts a magnetic field generated by said permanent magnets, said yoke being provided with a first through hole extending throughout said yoke in the focusing direction, magnetic gaps located at opposite sides of said first through hole in the track traversing direction and each accommodating respective one of said permanent magnets, and a second through hole for admitting the light beam issuing in the track traversing direction to guide the light beam to said first through hole, said first through hole and said magnetic gaps each having a cross-section which is relatively long in the track traversing direction;

beam deflecting means loosely fitted in said first through hole for deflecting in the focusing direction the light beam which is incident to said beam deflecting means via said second through hole;

a carriage supporting said beam deflecting means;

an objective lens for focusing the light beam deflected by said beam deflecting means in the focusing direction onto said recording medium surface;

a lens holder holding said objective lens and mounted on said carriage movably in the focusing direction;

guide members supporting said magnetic circuit means and said carriage movably in the track traversing direction along said recording medium surface;

a focusing coil wound around said lens holder and partly contained in said magnetic gaps for, when a current is fed through said focusing coil, transporting said lens holder in the focusing direction in cooperation with the magnetic field which is developed by said permanent magnets;

tracking coils wound around said lens holder and partly contained in said magnetic gaps for, when a current is fed through said tracking coils, transporting said lens holder in the track traversing direction in cooperation with the magnetic field which is developed by said permanent magnets; and drive means connected to said magnetic circuit means for transporting said magnetic circuit means in the track traversing direction along said recording medium surface with said magnetic circuit means being guided by said guide means.

2. An assembly in accordance with claim 1, further comprising optics for emitting the light beam in the track traversing direction toward said second through hole and receiving the reflection via said through hole.

3. An assembly in accordance with claim 1, wherein said lens holder comprises a framework loosely surrounding a portion of said yoke which includes said first through hole and said magnetic gaps and being open in the track traversing direction, said framework including projections for retaining said focusing coil and said tracking coils.

4. An assembly in accordance with claim 3, wherein said guide members comprise a pair of rods, said magnetic circuit means being slidably mounted on said rods.

5. An assembly in accordance with claim 4, wherein said carriage comprises:

a base plate having a generally flat configuration substantially parallel to said recording medium surface and being slidably mounted on said rods; and a first tubular member provided with a first opening through a circumferential wall substantially in alignment with said second through hole, said beam deflecting means being securely mounted in said first tubular member;

said lens holder comprising a second tubular member provided with a second opening through a circumferential wall substantially in alignment with said first opening, said first tubular member being loosely received in said second tubular member, said objective lens being supported on an end of said second tubular member adjacent to said recording medium surface.

6. An assembly in accordance with claim 1, further comprising position sensing means for sensing a position of said carriage relative to said magnetic circuit means.

7. An assembly in accordance with claim 7, wherein said first through hole is elongate over one unit of an effective recording range of said recording medium surface in the track traversing direction, said drive means transporting said magnetic circuit means and said carriage over the effective recording range of said recording medium surface in the track traversing direction.

8. An optical head assembly for use with an optical disk apparatus for focusing a light beam issuing in a track traversing direction which is substantially parallel to a radial direction of an optical disk onto a recording medium surface of said optical disk from a focusing direction which is substantially perpendicular to said recording medium surface, and guiding a reflection from said recording medium surface along a same path as but in the opposite direction to the light beam to record and/or reproduce information out of said optical disk, said assembly comprising:

stationary magnetic circuit means extending over an effective recording range of said recording medium surface in the track traversing direction, said magnetic circuit means comprising permanent magnets each being elongate in the track traversing direction and a yoke for forming a magnetic circuit which conducts a magnetic field generated by said permanent magnets, said yoke being provided with a first through hole extending throughout said yoke in the focusing direction, magnetic gaps located at opposite sides of said first through hole in the track traversing direction and each accommodating a respective one of said permanent magnets, and a second through hole for admitting the light beam issuing in the track traversing direction to guide the light beam to said first through hole, said first through hole and said magnetic gaps each having a cross-section which is relatively long in the track traversing direction;

beam deflecting means loosely fitted in said first through hole for deflecting in the focusing direction the light beam which is incident to said beam deflecting means via said second through hole;

a carriage supporting said beam deflecting means;

an objective lens for focusing the light beam deflected by said beam deflecting means in the focusing direction onto said recording medium surface;

a lens holder holding said objective lens and mounted on said carriage movably in the focusing direction;

guide members supporting said carriage movably in the track traversing direction along said recording medium surface;

a focusing coil wound around said lens holder and partly contained in said magnetic gaps for, when a current is fed through said focusing coil, transporting said lens holder in the focusing direction in cooperation with the magnetic field which is developed by said permanent magnets; and tracking coils wound around said lens holder and partly contained in said magnetic gaps for, when a current is fed through said tracking coils, transporting said lens holder in the track traversing direction in cooperation with the magnetic field which is developed by said permanent magnets.

9. An assembly in accordance with claim 8, further comprising optics for emitting the light beam in the track traversing direction toward said second through hole and receiving the reflection via second through hole.

10. An assembly in accordance with claim 8, wherein said lens holder comprises a framework loosely surrounding a portion of said yoke which includes said first through hole and said magnetic gaps and being open in the track traversing direction, said framework including projections for retaining said focusing coil and said tracking coils.

11. An assembly in accordance with claim 10, wherein said guide members comprise a pair of rods, said carriage being slidably mounted on said rods.

12. An assembly in accordance with claim 11, wherein said carriage comprises:

a base plate having a generally flat configuration substantially parallel to said recording medium surface and being slidably mounted on said rod; and a first tubular member formed with a first opening through a peripheral wall substantially in alignment with said second through hole, said beam deflecting means being securely mounted in said first tubular member;

said lens holder comprising a second tubular member provided with a second opening through a peripheral wall substantially in alignment with said first opening, said first tubular member being loosely received in said second tubular member, said objective lens being mounted on an end of said second tubular member adjacent to said recording medium surface.

* * * * *

UNITED STATES PATENT AND TRADEMARK OFFICE
CERTIFICATE OF CORRECTION

PATENT NO. : 4,958,335

DATED : September 18, 1990

INVENTOR(S) :

It is certified that error appears in the above-identified patent and that said Letters Patent is hereby corrected as shown below:

ON TITLE PAGE:

IN THE TITLE:

At line 3 of the title, delete first occurrence of "HIGH".

Signed and Sealed this

Thirty-first Day of March, 1992

Attest:

HARRY F. MANBECK, JR.

*Attesting Officer*          *Commissioner of Patents and Trademarks*